(12) United States Patent
Anderson et al.

(10) Patent No.: US 11,554,561 B2
(45) Date of Patent: *Jan. 17, 2023

(54) INTEGRALLY STIFFENED BONDED PANEL WITH MACHINED POCKETS AND METHODS OF MANUFACTURE

(71) Applicant: The Boeing Company, Chicago, IL (US)

(72) Inventors: David M. Anderson, Sammamish, WA (US); Jeffrey P. Baucum, Sammamish, WA (US)

(73) Assignee: THE BOEING COMPANY, Chicago, IL (US)

( * ) Notice: Subject to any disclaimer, the term of this patent is extended or adjusted under 35 U.S.C. 154(b) by 541 days.

This patent is subject to a terminal disclaimer.

(21) Appl. No.: 16/658,738

(22) Filed: Oct. 21, 2019

(65) Prior Publication Data
US 2021/0114319 A1    Apr. 22, 2021

(51) Int. Cl.
| | | |
|---|---|---|
| *B29C 70/54* | (2006.01) | |
| *B64C 3/20* | (2006.01) | |
| *B29C 70/30* | (2006.01) | |
| *B29K 63/00* | (2006.01) | |
| *B29K 105/08* | (2006.01) | |
| *B29K 307/04* | (2006.01) | |
| *B29L 31/30* | (2006.01) | |

(52) U.S. Cl.
CPC .......... *B29C 70/545* (2013.01); *B29C 70/302* (2021.05); *B64C 3/20* (2013.01); *B29K 2063/00* (2013.01); *B29K 2105/0872* (2013.01); *B29K 2307/04* (2013.01); *B29L 2031/3085* (2013.01)

(58) Field of Classification Search
None
See application file for complete search history.

(56) References Cited

U.S. PATENT DOCUMENTS

| | | | |
|---|---|---|---|
| 3,265,556 A * | 8/1966 | Albert | B29C 53/24 |
| | | | 156/324 |
| 4,934,580 A | 6/1990 | Sutton | |
| 6,358,590 B1 | 3/2002 | Blair et al. | |
| 7,097,731 B2 | 8/2006 | Puriefoy et al. | |
| 11,338,903 B2 * | 5/2022 | Anderson | B32B 3/266 |
| 2007/0166581 A1 | 7/2007 | Terazaki et al. | |
| 2012/0040159 A1 | 2/2012 | Pechnik | |
| 2016/0168441 A1 | 6/2016 | Maisonnave et al. | |
| 2017/0306466 A1 | 10/2017 | Meyer et al. | |
| 2018/0281923 A1 | 10/2018 | Walker et al. | |
| 2020/0101690 A1 | 4/2020 | Oishi et al. | |

FOREIGN PATENT DOCUMENTS

EP    2263863 A2    12/2010

OTHER PUBLICATIONS

European Search Report dated Mar. 6, 2021 for corresponding EP application.

* cited by examiner

*Primary Examiner* — Jeffry H Aftergut
(74) *Attorney, Agent, or Firm* — Coats & Bennett, PLLC (57) ABSTRACT

Methods, systems, and apparatuses are disclosed for the manufacture of composite components having incorporated reinforcing structures machined into composite material substrates, and composite components manufactured according to disclosed methods, and assemblies and larger structures comprising the composite material components.

20 Claims, 9 Drawing Sheets

INTEGRALLY STIFFENED BONDED PANEL WITH MACHINED POCKETS AND METHODS OF MANUFACTURE

TECHNOLOGICAL FIELD

The present disclosure relates generally to the field of composite materials and structures and components made from composite materials. More specifically the present disclosure relates to the field of machining composite materials for use as composite material components, and manufacturing composite components using the machined composite materials.

BACKGROUND

Aircraft structures, including, for example, wing structures typically include a complex assembly that includes stringer, rib, spars, etc. as reinforcement structures in the interior of the wing assembly. Ribs are typically spatially arranged perpendicularly along the longitudinal length of the wing interior. Stringers are typically connected to the wing skin, with ribs and spars connected to stringer assemblies to form a reinforced wing box assembly with desired strength and rigidity. The stringers typically extend along the longitudinal length of the wing interior.

Aircraft wings constructed with reinforcing stingers, ribs, spars, fasteners, etc. are costly on a component level, and can further increase overall cost of a wing assembly process, and further increase the overall cost of structures incorporating such components and assemblies. Further, interior wing components that are typically used as wing reinforcements, and the fasteners used to connect the reinforcements add considerable weight to the wing assembly and add to the overall weight of the aircraft comprising such wing assemblies.

SUMMARY

According to a present aspect a method is disclosed including orienting a plurality of composite material layers onto a tool to form a composite material substrate, with the composite material substrate having a composite material substrate thickness, and with the tool having a tooling surface. The composite material substrate further includes a composite material substrate first surface and a composite material substrate second surface, with the composite material substrate first surface positioned proximate to the tooling surface. The method further includes orienting a separator layer proximate to the composite material substrate second surface; orienting a composite material top layer onto the separator layer; and at least partially curing the composite material substrate and the composite material top layer. The method further includes separating the at least partially cured composite material top layer from the at least partially cured composite material substrate. The method further includes orienting a composite material removal device proximate to the composite material substrate second surface, and machining at least one recess into the composite material substrate and removing a predetermined amount of material from the composite material substrate to form a recess in the composite material substrate, with the recess configured to extend from the composite material second surface to a predetermined distance into the composite material substrate thickness to form a machined composite material substrate, and with the machined composite material substrate comprising a machined composite material substrate first surface and a machined composite material substrate second surface.

In another aspect, the step of machining at least one recess into the composite material further includes machining a plurality of recesses into the composite material substrate.

In another aspect, the recess is configured to include a predetermined geometric profile that can include at least one of a rectangle, a circle, an ellipse, a triangle, a polygon, an irregular shape, or combinations thereof.

In a further aspect, the predetermined distance the recess extends into the machined composite material substrate thickness is equal to from about 50% to about 80% of the composite material substrate thickness.

In another aspect, the predetermined distance the recess extends into the machined composite material substrate thickness is equal to from about 65% of the composite material substrate thickness.

According to a present aspect a method is disclosed including orienting a plurality of composite material layers onto a tool to form a composite material substrate, with the composite material substrate having a composite material substrate thickness, and with the tool having a tooling surface. The composite material substrate further includes a composite material substrate first surface and a composite material substrate second surface, with the composite material substrate first surface positioned proximate to the tooling surface. The method further includes orienting a separator layer device proximate to the composite material substrate second surface and orienting a composite material top layer onto the separator layer, and at least partially curing the composite material substrate and the composite material top layer. The method further includes separating the at least partially cured composite material top layer from the at least partially cured composite material substrate. The method further includes orienting a composite material removal device proximate to the composite material substrate second surface, and machining at least one recess into the composite material substrate and removing a predetermined amount of material from the composite material substrate to form a recess in the composite material substrate, with the recess configured to extend from the composite material second surface to a predetermined distance into the composite material substrate thickness to form a machined composite material substrate, and with the machined composite material substrate comprising a machined composite material substrate first surface and a machined composite material substrate second surface. A method further includes applying an adhesive material or other bonding agent to at least one of the composite material top layer or the machined composite material substrate second surface, orienting the composite material top layer onto the machined composite material substrate second surface, and bonding the composite material top layer to the machined composite material substrate second surface.

In a further aspect, in presently disclosed methods the material removal device is a laser.

In another aspect, in presently disclosed methods the material removal device is a CNC device including, for example, a CNC milling machine, etc.

In another aspect, in presently disclosed methods the material removal device is in communication with a controller.

In a further aspect, the plurality of recesses is machined into the composite substrate material in a predetermined pattern.

in another aspect, a plurality of recesses is machined into the composite material substrate, that can include machining the plurality of recesses into the composite material substrate in a predetermined pattern.

In another aspect, a composite component is disclosed, with the composite component including a composite material substrate including a composite material substrate first surface and a composite material substrate second surface, with the composite material second surface configured to comprise at least one recess, said recess configured to extend from the composite material second surface to a predetermined distance into the composite material substrate from composite material substrate second surface to form a machined composite material substrate, and with the machined composite material substrate including a machined composite material substrate first surface and a machined composite material substrate second surface. The component further includes a composite material top layer bonded to the machined composite material substrate second surface, and wherein, the recess is configured to be bounded by surrounding composite material substrate and the composite material top layer.

In a further aspect, the composite component includes an adhesive layer disposed between the machined composite material substrate second surface and the composite material top layer.

In another aspect, at least one of the composite material substrate and the composite material top layer includes a fiber-containing epoxy-based composite material.

In another aspect, at least one of the composite material substrate and the composite material top layer includes a carbon fiber-containing epoxy-based composite material.

Another present aspect discloses a vehicle including a composite component that includes a composite material substrate including a composite material substrate first surface and a composite material substrate second surface, with the composite material second surface configured to comprise at least one recess, said recess configured to extend from the composite material second surface to a predetermined distance into the composite material substrate from composite material substrate second surface to form a machined composite material substrate, and with the machined composite material substrate including a machined composite material substrate first surface and a machined composite material substrate second surface. The component further includes a composite material top layer adhered or bonded to the machined composite material substrate second surface, and wherein, the recess is configured to be bounded by surrounding composite material substrate and the composite material top layer.

In another aspect, the vehicle comprises at least one of: a manned aircraft; an unmanned aircraft; a manned spacecraft; an unmanned spacecraft; a manned rotorcraft; an unmanned rotorcraft; a manned terrestrial vehicle; an unmanned terrestrial vehicle; a manned surface water borne vehicle; an unmanned surface water borne vehicle; a manned sub-surface waterborne vehicle; an unmanned sub-surface waterborne vehicle; or combinations thereof.

A further present aspect discloses a wing assembly including a composite material substrate including a composite material substrate first surface and a composite material substrate second surface, with the composite material second surface configured to comprise at least one recess, said recess configured to extend from the composite material second surface to a predetermined distance into the composite material substrate from composite material substrate second surface to form a machined composite material substrate, and with the machined composite material substrate including a machined composite material substrate first surface and a machined composite material substrate second surface. The component further includes a composite material top layer adhered or bonded to the machined composite material substrate second surface, and wherein, the recess is configured to be bounded by surrounding composite material substrate and the composite material top layer.

In another aspect, the presently disclosed wing assembly includes an inner wing skin including the disclosed machined composite material substrate.

In another aspect, the presently disclosed wing assembly includes an outer wing skin in the form of the presently disclosed composite material top layer, with the outer wing skin adhered or bonded to the inner wing skin to form a wing assembly, with the inner wing skin including the disclosed machined composite material substrate.

The features, functions and advantages that have been discussed can be achieved independently in various aspects or may be combined in other aspects, further details of which can be seen with reference to the following description and the drawings.

BRIEF DESCRIPTION OF THE DRAWINGS

Having thus described variations of the disclosure in general terms, reference will now be made to the accompanying drawings, which are not necessarily drawn to scale, and wherein:

DETAILED DESCRIPTION

Aspects of the present disclosure are directed to a composite material construction that can be a two-piece construction where one piece can be a composite material substrate that is machined to form a machined composite material substrate with portion of the composite material substrate removed by a material removal device to form a predetermined pattern of removed material. The removed material can form at least one recess (referred to equivalently herein as "pocket"), in the composite material substrate. The machined composite material substrate is then bonded to a composite material top layer with the at least one recess covered by the composite material top layer. Further present aspects contemplate the use of a thermoset material as the material substrate.

According to present aspects, the components manufactured according to disclosed methods and systems employ a two-piece design with the two pieces sized to ensure structural integrity even in the event of a failure at the bond line. Further aspects contemplate use of the manufactured components as wing skins that are compression dominated (upper skins), as well as wing skins that are tension dominated (lower skins).

Figure 1:
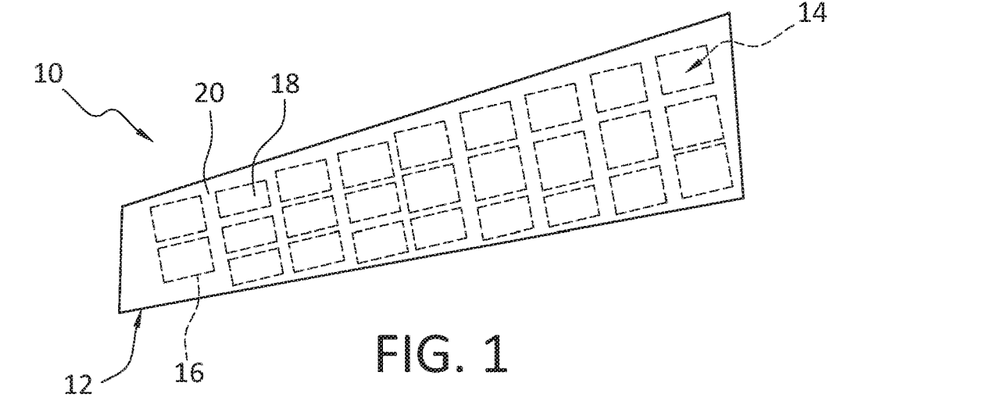
FIG. 1 is an illustration of a wing assembly according to present aspects.
Figure 3:
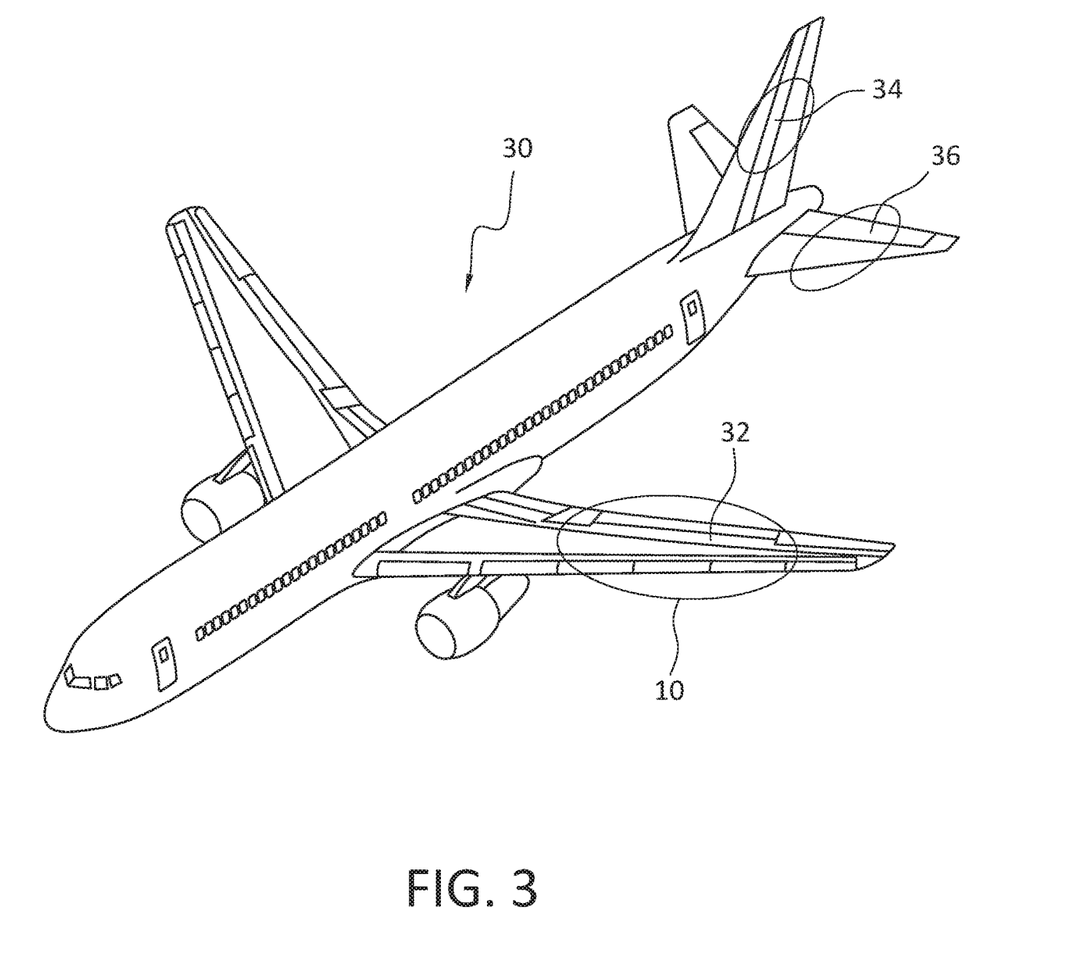
FIG. 3 is an illustration of a vehicle in the form of an aircraft comprising assemblies according to present aspects.

FIG. 1 shows an overhead perspective view of a composite assembly shown in the form of a non-limiting wing assembly that can be configured for attachment to an aircraft (shown in FIG. 3). As shown in FIG. 1, composite component 10 (that can be, in non-limiting fashion, and shown in FIG. 1 in an exemplary illustration, as a wing assembly) includes a 2-piece assembly comprising a composite material substrate 12 that further comprises recesses 14 that appear in the composite material substrate 12 in a predetermined pattern, with the individual recesses further comprising a predetermined geometric profile (shown in FIG. 1 as a predetermined pattern of rectangles) that can be the same or different from other recesses. As further shown in FIG. 1, the composite component 10 further comprises a composite material top layer 20 that is fixedly attached to the composite material substrate 12.

Figure 2A:
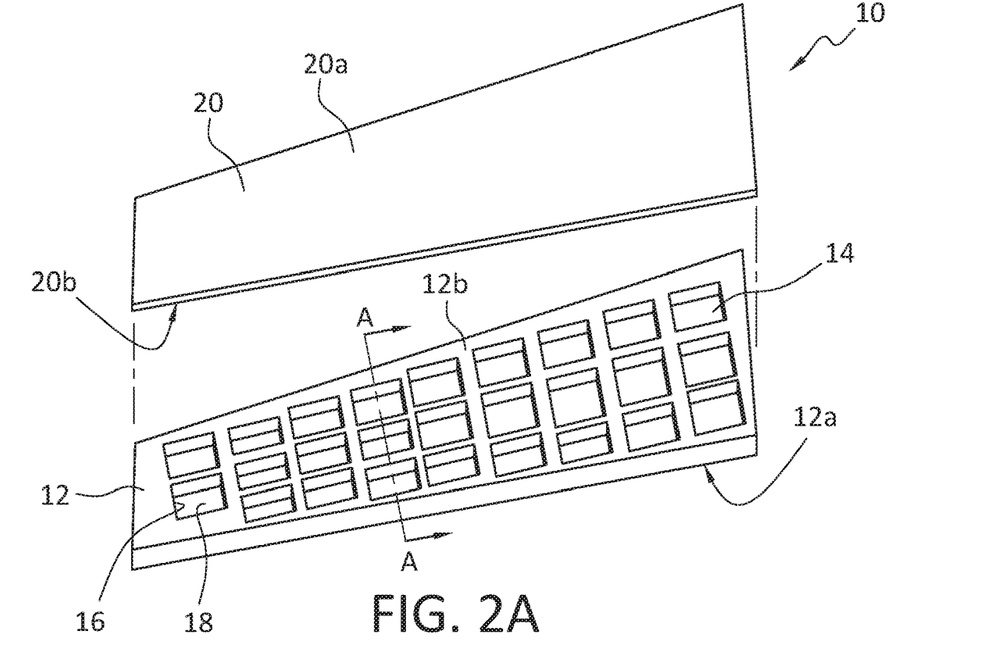
FIG. 2A is a perspective view of a wing assembly construction according to present aspects.

FIG. 2A is a perspective view of the composite component 10 shown in FIG. 1. As shown in FIG. 2A, composite component 10 includes a 2-piece assembly comprising composite material substrate 12 that further comprises recesses 14 that appear in composite material substrate 12 in a predetermined pattern, with the individual recesses further comprising a predetermined geometric profile (shown in FIG. 1 as a predetermined pattern of rectangles) that can be the same or different from other recesses. Composite material substrate 12 further comprises a composite substrate material first surface (also referred to equivalently herein as composite substrate material first side) 12a, a composite substrate material second surface (also referred to equivalently herein as composite substrate material second side) 12b. FIG. 2A further shows composite material top layer 20 that includes composite material top layer 20 comprises a composite material top layer first surface (also referred to equivalently herein as composite material top layer first side) 20a and a composite material top layer second surface (also referred to equivalently herein as composite material top layer second side) 20b.

Figure 2B:
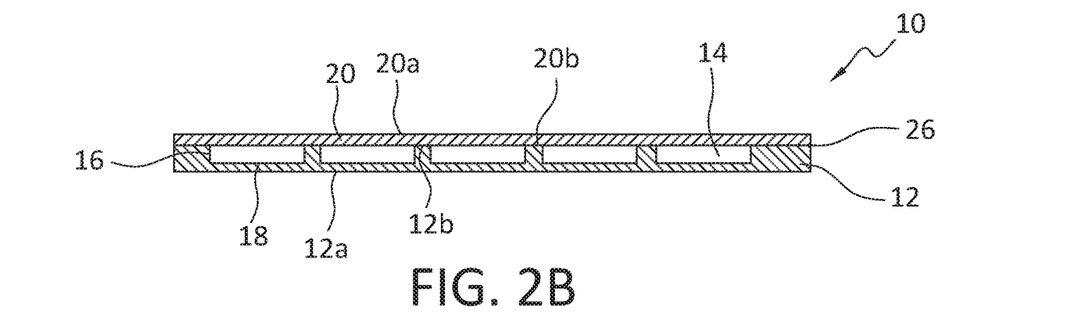
FIG. 2B is a cross-sectional view of the wing assembly of FIG. 1 according to present aspects.

FIG. 2B is a cross-sectional view of the composite assembly shown in FIG. 1 taken across line "A-A". As shown in FIG. 2B composite component 10 (that can be, in non-limiting fashion, and shown in FIG. 1 in an exemplary illustration, as a wing assembly) includes a 2-piece assembly comprising a composite material substrate 12. Composite material substrate 12 further comprises a composite substrate material first surface (also referred to equivalently herein as composite substrate material first side) 12a, a composite substrate material second surface (also referred to equivalently herein as composite substrate material second side) 12b, and recesses 14. As shown in FIGS. 1, 2A and 2B, recesses 14 appear in the composite material substrate 12 in a predetermined pattern, with the individual recesses 14 further comprising a predetermined geometric profile (shown in FIGS. 1, 2A and 2B as a predetermined pattern of rectangles) that can be the same or different from other recesses. As further shown in FIG. 2B, composite component 10 further comprises a composite material top layer 20 that is fixedly attached to the composite material substrate 12. Composite material top layer 20 comprises a composite material top layer first surface 20a and a composite material top layer second surface 20b. Recesses 14 are shown as bounded by recess wall 18, recess floor 16, and composite material top layer second surface 20b. As shown in FIG. 2B, an adhesive material layer 26 is interposed between composite substrate material second surface 12b and composite material top layer first surface 20a.

FIG. 3 is a representative illustration of a vehicle 30, in the non-limiting form of an aircraft, showing wing 32 comprising composite component 10 of the type disclosed herein and, for example, as shown in any of FIGS. 1, 2, and 3. While the composite material substrate is shown in the accompanying FIGs. incorporated into a wing assembly for an aircraft, according to present aspects, composite components incorporating the machined composite material substrates with recesses machined into the composite material substrates can be used in the manufacture of other aircraft and other vehicle components including, for example, tail section vertical stabilizer 34, tail section horizontal stabilizer 36, etc.) in addition to assemblies in, for example, vehicles including, without limitation a manned aircraft; an unmanned aircraft; a manned spacecraft; an unmanned spacecraft; a manned rotorcraft; an unmanned rotorcraft; a manned terrestrial vehicle; an unmanned terrestrial vehicle; a manned surface water borne vehicle; an unmanned surface water borne vehicle; a manned sub-surface waterborne vehicle; an unmanned sub-surface waterborne vehicle; or combinations thereof.

Figure 4A:
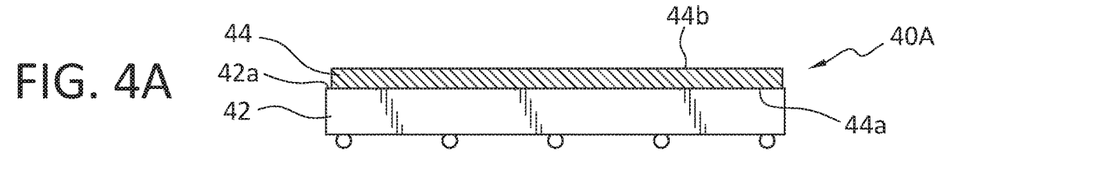
FIG. 4A is a side view of a manufacturing step according to present aspects.

FIGS. 4A, 4B, 4C, 4D, 4E, 4F, and 4G (collectively referred to herein as FIGS. 4A-4G) represent an illustrative progression of stages, according to present aspects, in the manufacture of the presently disclosed composite components. As shown in FIG. 4A, initial stage 40A shows a molding tool 42 having a molding tool surface 42a, onto which is deposited (to a predetermined thickness) a predetermined amount of composite material substrate 44. Composite material substrate 44 has a composite material substrate first surface 44a in contact with the molding tool, and a composite material substrate second surface 44b. According to present aspects, a predetermined thickness of composite material substrate 44 (uncured) is deposited onto molding tool 42 to form a predetermined thickness of cured composite material substrate while accounting for composite material shrinkage during curing.

According to present aspects, non-limiting representative composite materials for use in making the composite material substrate and the composite material top layer can include resin-containing materials such as, for example, diglycidyl ethers of bisphenol A; diglycidyl ethers of bisphenol F; N,N,N',N'-tetragylcidyl-4,4'-diaminophenylmethane; p-aminophenol triglycidyl ether; epoxy phenol novolac resins; epoxy cresol novolac resins; 1,3,5-triglycidyl isocyanurate; tris(2,3-epoxypropyl)isocyanurate (and isocyanurates); glycerol diglycidyl ether; trimethylolpropane triglycidyl ether, etc., thermoset materials, and combinations thereof. According to further aspects, non-limiting fiber components of fiber-containing materials include carbon fibers, boron fibers, glass fibers, aramid fibers, etc., and combinations thereof.

The molding tool can alternately be referred to herein and otherwise include "mandrels", and can be made of metals or non-metals and can be any device capable of supporting a composite material laminate lay-up (e.g., the lay-up comprising any predetermined number of individual composite material prepregs, etc.) and also capable imparting or transferring surface characteristics from a tooling surface to a surface of the composite laminate surface including, for example, an outer mold line or an inner mold line. According to further present aspects, the methods and systems disclosed herein can be used to machine non-prepreg materials including, for example, single and/or multilayered thermoset materials.

Figure 4B:
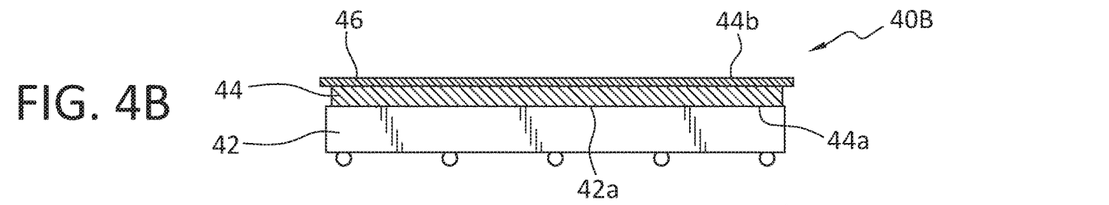
FIG. 4B is a side view of a manufacturing step according to present aspects.

As shown in FIG. 4B, in second stage 40B a separator layer 46, that can be, for example, a caul plate, is oriented in position proximate to the composite material substrate second surface 44b. The separator layer 46 can be a separator film or separator sheet, in combination with, or integrating a release material film or other release agent, etc. The separator layer deposited onto or otherwise oriented onto the composite material substrate second surface 44b, such that the separator layer 46 is interposed between the composite material substrate surface 44b and the composite material top layer (shown in FIG. 4C).

Figure 4C:
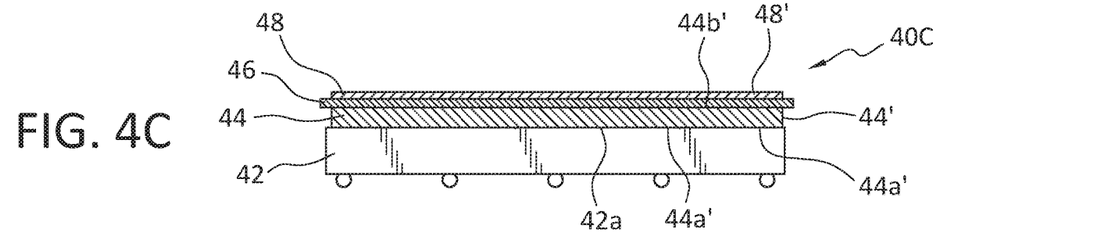
FIG. 4C is a side view of a manufacturing step according to present aspects.
Figure 4D:
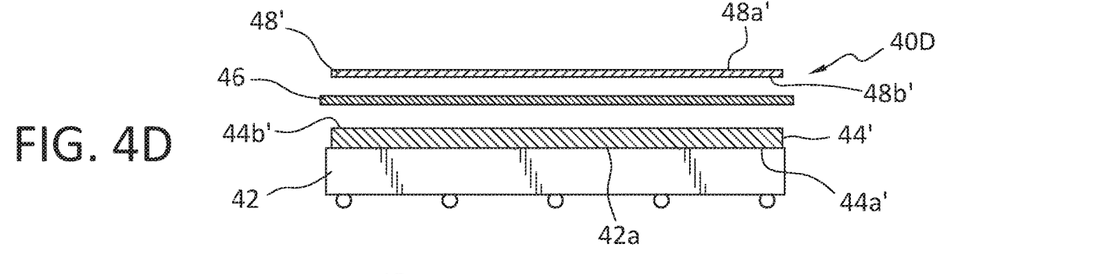
FIG. 4D is a side view of a manufacturing step according to present aspects.

In the third stage 40C, shown in FIG. 4C, a composite material top layer 48 is deposited onto the separator layer 46. The separator layer in the form of, for example a separator sheet, in combination with a release material film or other release agent, etc., is deposited onto or otherwise positioned or otherwise interposed between the composite material top layer 48 and the composite material substrate 44. The separator layer 46 can be any layer, film, etc. that can act as a parting layer or parting plane for the purpose of facilitating the separation of the at least partially cured composite material top layer 48' from the at least partially cured composite material substrate 44' (e.g., as shown in FIG. 4D). According to presently disclosed methods, heat, or heat and pressure are provided for the purpose of at least partially curing the composite material substrate 44 and at least partially curing the composite material top layer 48 to form an at least partially cured composite material substrate 44' and an at least partially cured composite material top layer 48' (for example, as shown in FIG. 4D). The at least partially cured composite material top layer 48' comprises an at least partially cured composite material top layer first surface 48a' and an at least partially cured composite material top layer second surface 48b'. The at least partially cured composite material substrate 44' comprises an at least partially cured composite material substrate first surface 44a' and an at least partially cured composite material substrate second surface 44b'.

In the fourth stage shown in FIG. 4D, the at least partially cured composite material top layer 48' is separated from the at least partially cured composite material substrate 44'. As further shown in FIG. 4D, the at least partially cured composite material top layer 48' is removed from the now at least partially cured composite material substrate 44'. The at least partially cured composite material substrate 44' comprises an at least partially cured composite material substrate first surface 44a' and an at least partially cured composite material substrate second surface 44b'. The at least partially cured composite material top layer 48' comprises an at least partially cured composite material top layer first surface 48a' and an at least partially cured composite material top layer second surface 48b'. As shown in FIG. 4D, after at least partially curing the composite layers, the layers can be separated and, according to one aspect, if the separator layer remains as a discrete layer, the separator layer is removed. In another aspect, during the separator layer can become indistinguishable from the surrounding layers, but the function of the separator layer is accomplished through curing such that the at least partially cured composite material top layer 48' and the at least partially cured composite material substrate 44' can be separated from one another. While the at least partially cured composite material substrate 44' is shown in FIGS. 4D and 4E as being retained in contact with the molding tool 42, according to present aspects, alternative manufacturing processes and stages include removing the at least partially cured composite material substrate 44' from the molding tool 42 after forming the at least partially cured composite material substrate 44'.

Present aspects contemplate the use of an external heating device (e.g., autoclave, oven, heaters, etc.), optionally in combination with pressure, to achieve an at least partial cure of the composite material substrate and the composite material top layer. Further present aspects contemplate at least partially curing the composite material substrate and the composite material top layer under pressure while heating according to accepted composite material curing regimens and protocols.

Figure 4E:
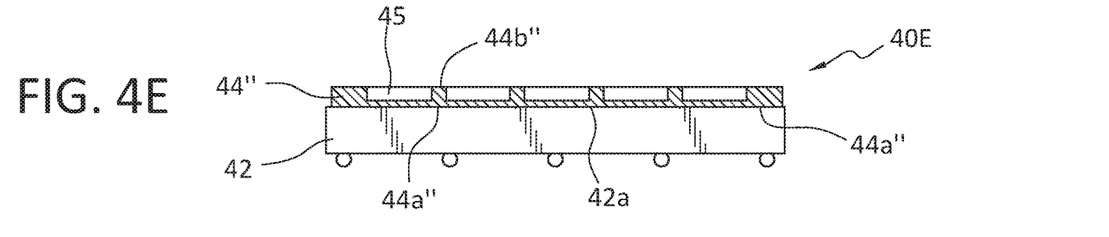
FIG. 4E is a side view of a manufacturing step according to present aspects.

The fifth stage is shown at FIG. 4E, where the at least partially cured composite material substrate 44' has been machined to form a machined composite material substrate 44". The machined composite material substrate 44" comprises a machined composite material substrate first surface 44a" and a machined composite material substrate second surface 44b". According to present aspects, and as will be later described more fully, the at least partially cured composite material substrate 44' is machined to form recesses in the at least partially cured composite material substrate 44'. The recesses 45 are shown extending from the machined composite substrate material second surface 44b" and into the substrate to a predetermined distance into the substrate thickness.

While FIG. 4E is not drawn to scale, according to present aspects, the depth of the recesses can be any practical depth that will recognize and account for competing factors of weight reduction of the substrate through material removal (e.g. machining, etc.) and retained stiffness and/or strength of the machined composite material substrate. According to present aspects, the balancing of strength, weight, and stiffness factors can be achieved by machining the recesses to a depth into the composite material substrate representing a distance from the surface (e.g., a depth distance, etc.) of from about 50% to about 80% of the total thickness of the composite substrate material. In another aspect, the machining of the recesses into the composite material substrate is conducted such that the depth, or depth distance, of the recesses is machined into the composite substrate material to a depth ranging from about 10% to about 90% of the total thickness of the composite material substrate. In a further aspect, the machining of the recesses into the composite material substrate is conducted such that the depth, or depth distance, of the recesses is machined into the composite substrate material to a depth ranging from about 20% to about 80% of the total thickness of the composite material substrate For example, according to present aspects, a composite material component incorporating presently disclosed machined composite material substrates can be tailored to have a predetermined material stiffness (for example, as determined according to ASTM C297). According to present aspects, the machining of the recesses into the composite material substrate is conducted such that the depth, or depth distance, of the recesses machined into the composite substrate material is not more than a depth ranging from about 50% to about 80% of the total thickness of the composite material substrate. That is, by way of example, and according to present aspects, if the total thickness of a composite material substrate is 1.5 inches thick, the depth of the recess machined into the composite material substrate extends from the composite material substrate surface to a depth into the composite material substrate ranging from about 0.75 inches to about 1.2 inches. By way of further example, and according to present aspects, if the total thickness of a composite material substrate is 1.0 inches thick, the depth of the recess machined into the composite material substrate extends from the composite material substrate surface to a depth into the composite material substrate ranging from about 0.50 inches to about 0.8 inches. According to present aspects, by regulating the amount of material removal from the composite material substrate and placement or location of material removal from the composite material substrate, the strength, stiffness and other characteristics can be tailored to accommodate a multitude of predetermined design specifications (e.g., parameters).

According to further present aspects, the machining of a predetermined pattern of recesses machined at predetermined locations and at predetermined depths into the composite material substrate can be controlled such that the composite material substrate provides a reinforcement function to the wing assembly that can obviate the need for discrete reinforcing layers or that can obviate the need for a number of reinforcing components previously required in wing assemblies (e.g., stringers, frames, fasteners attaching ribs, stringers, frames, etc.). The wing assemblies and composite material substrates disclosed herein, and according to present aspects, obviate the need for the incorporation of discrete reinforcing components or discrete reinforcing layers, and, in so doing, can, reduce the number of inventoried parts for, for example, a wing assembly. According to a predetermined design, overall weight reduction of objects incorporating the presently disclosed components can be realized. According to present aspects, the composite material substrate is machined also for the purpose of building in integral reinforcing elements and properties into the composite material substrate. When the composite material substrate is used as in inner aircraft wing in a wing assembly, the machined composite material substrate comprises reinforcement capabilities and elements that closely approximate or even exceed the reinforcement capabilities of additional stringers, ribs, frame elements, fasteners, etc. that formerly performed the function of the machined composite material that, according to present aspects includes integral reinforcement elements machined into the composite material substrate; but with a significant weight reduction as compared to typical wing assemblies that necessarily include, for example, stringers, spars, frame elements, fasteners, etc. If a particular component weight (e.g., a wing or wing assembly component, etc.) must be maintained to preserve overall design constraints that can include, for example, proper balancing, etc., through material selection and material processing (e.g., curing, etc.), the presently obtainable components and assemblies can be manufactured to approximate the weight of former components that incorporate the additional reinforcing components (e.g., stringers, spars, frame elements, fasteners, etc.).

When weight reduction is a factor, present methods, systems, and apparatuses can produce components having a reduced weight without sacrificing predetermined characteristics including, for example, strength, stiffness, etc. By way of example, an exemplary composite material panel having dimensions of 72 inches (width)×720 inches (length)×1.25 inches (thickness) has a volume of 64,800 in$^3$. According to present disclosed methods, if a pattern of recesses having dimensions of 7 inches (width)×22 inches (length)×1 inch (thickness) is removed from the panel, and 240 recesses are machined into the panel, the total amount of material removed equates to 36,960 in$^3$. Such a removal of material therefore results in a volume reduction of about 57% along with a commensurate weight reduction. Such a weight reduction in a structural component (e.g., a wing panel in an aircraft) that is also machined to afford reinforcement while obviating the need for additional internal structural supports and reinforcement (e.g., stringers, spars, frame elements, fasteners, etc.) can be significant. When the composite material substrates and components according to present aspects are incorporated into a vehicle, such weight savings can directly translate to lower fuel costs, increased payload, increased vehicle range, etc. The present aspects also significantly reduce component complexity and labor costs for manufacturing and installation, leading to further operational cost savings.

Figure 4F:
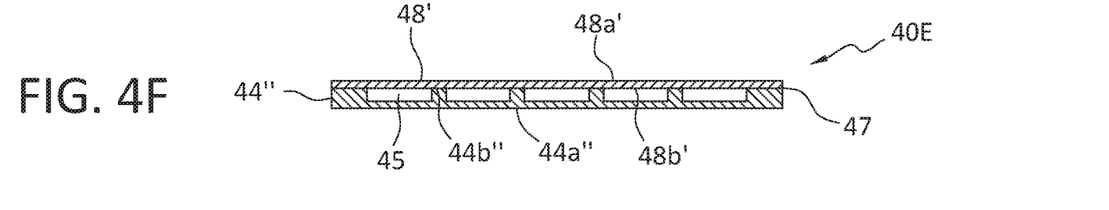
FIG. 4F is a side view of a manufacturing step according to present aspects.

FIG. 4F shows the at least partially cured composite material top layer 48' oriented in position proximate to the machined composite material substrate 44". As shown in FIG. 4F, an adhesive layer 47, referred to equivalently herein as a "bonding layer", can be interposed between the at least partially cured composite material top layer 48' and the machined composite material substrate second surface 44b". a component the at least partially cured composite material top layer 48' is disposed onto the machined composite material substrate second surface 44b". Adhesive layer 47 can comprise any adhesive or bonding material useful to bond the machined and at least partially cured composite material top layer 48' to the machined composite material substrate. According to present aspects the adhesive selected for use in the adhesive layer can be selected to be compatible with the substrate material and the top layer for the purpose of effected a predetermined bond. According to present aspects, the adhesive material selected for the adhesive material layer can be a co-curable adhesive that can co-cure and/or co-bonded within or outside of the curing regimens, protocols, and conditions observed for providing a final curing for the composite material substrate and the composite material top layer. Present aspects further contemplate bonding processes including pressure including, for example, processes under vacuum, etc.

Figure 4G:
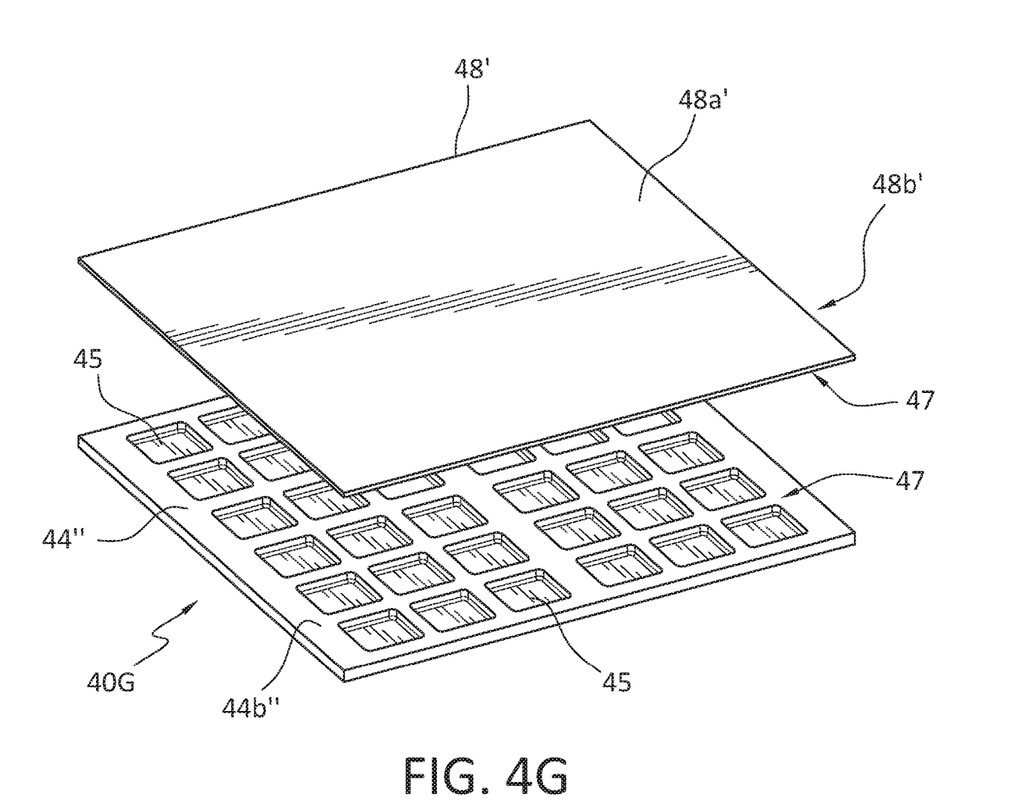
FIG. 4G is a side view of a manufacturing step according to present aspects.

FIG. 4G is a perspective exploded view of a component assembly 49 showing the at least partially cured composite material top layer 48' and the machined composite material substrate 44" with machined recesses 45 visible having been machined into the at least partially cured composite material substrate to form the machined composite material substrate 44" (and as shown in assembled form, for example, in FIG. 4F). As further shown in FIG. 4G, an adhesive layer 47 can be applied to at least one of the machined composite material substrate second surface 44b" and the at least partially cured composite material top layer second surface 48b' (shown in FIGS. 4F and 4G as the "underside" of the at least partially cured composite material top layer 48'.

Figure 5:
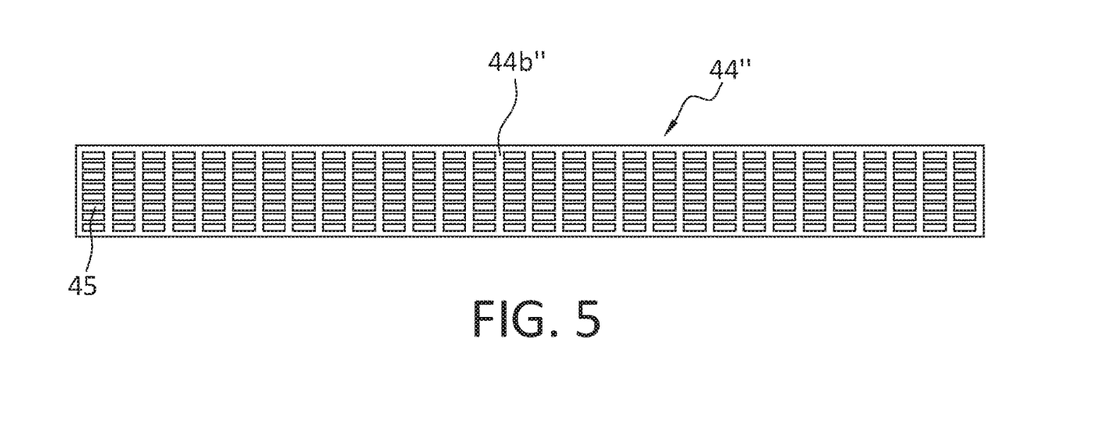
FIG. 5 is an overhead view of a machined composite substrate material according to present aspects.

FIG. 5 is an overhead view of a machined composite material substrate 44" showing a plurality of recesses 45 machined into the substrate, and in a predetermined pattern of material removal from the recesses.

Between illustrated steps 40D and 40E, (Shown in FIGS. 4D and 4E), present aspects are directed to a machining step to machine recesses into the at least partially cured composite material substrate 44' with the recesses formed into the composite material substrate to a predetermined thickness and in a predetermined pattern (and to form the machined composite material substrate 44"), with the individual recesses further comprising a predetermined geometric profile that can be the same or different from other recesses. The geometric profile is produced by removing a predetermined amount of composite substrate material from the composite material substrate, forming a three-dimensional recess of a predetermined shape and having a predetermined volume. According to further aspects, the predetermined volume can represent a three-dimensional geometric profile. The geometric profile of an individual recess in the predetermined pattern of recesses can be the same or can vary among the recesses, and can be any shape in two or three dimensions, including a rectangle, an ellipse, a circle, a triangle, a polygon, an irregular shape, or combinations thereof.

Figure 6A:
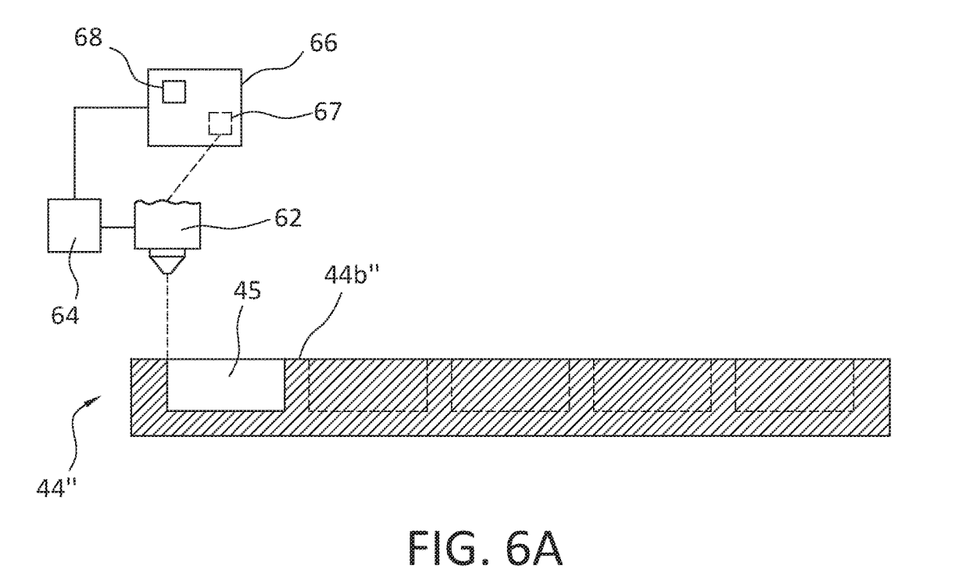
FIG. 6A is a cross-sectional side view of a composite material substrate machined to form a recess in the composite material substrate thickness according to present aspects.

FIG. 6A is a partial cross-sectional view of the at least partially cured composite material substrate 44' being machined to form a machined composite material substrate 44". As shown in FIG. 6A, a material removal device 62 is shown in the form of a laser. According to present aspects the material removal device 62 can be in communication with a controller 64 that can, in turn be in communication with a processor 66 that can be programmed to deliver a signal to the controller 64 that can control, for example, the activation, movement, speed, etc., of the material removal device 62 for the purpose of, for example, cutting into the at least partially cured composite material second surface 44b' to a predetermined distance or predetermined thickness according to a programmed value inputted, for example at a processor input 68 to form a plurality of recesses 45 that are formed into the at least partially cured composite material substrate in a predetermined pattern. In an alternate aspect, the material removal device 62 is in communication with the processor 66 and the processor includes an integrated controller 67.

Figure 6B:
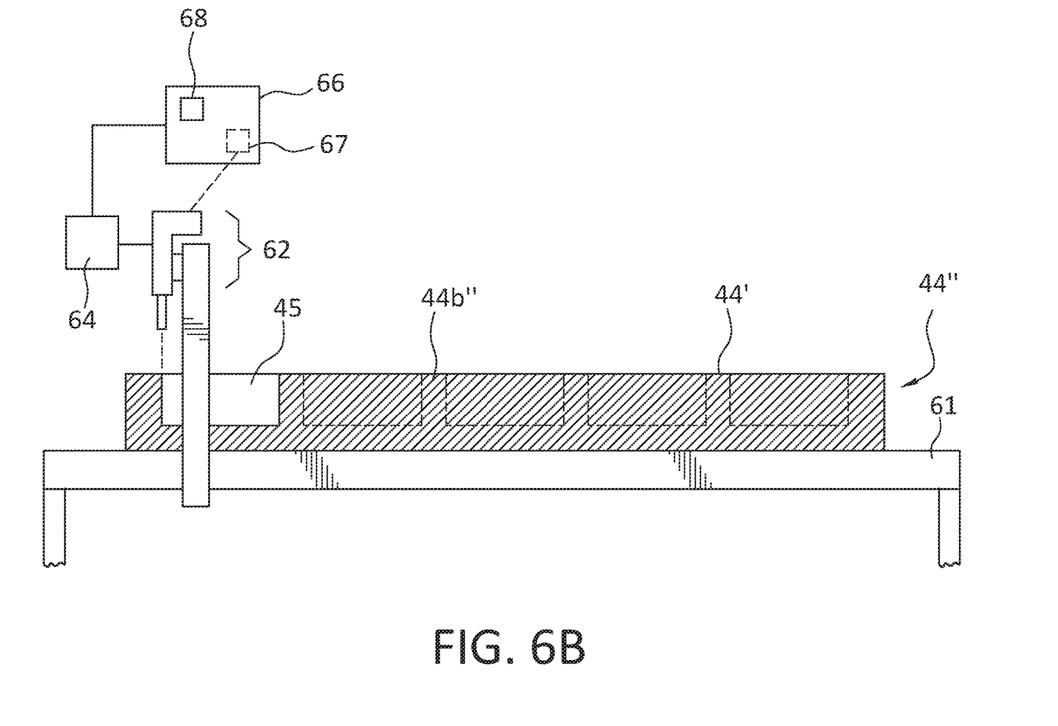
FIG. 6B is a cross-sectional side view of the composite material substrate of FIG. 6A machined to form a recess in the composite material substrate thickness according to present aspects.

FIG. 6B is a partial cross-sectional view of the at least partially cured composite material substrate 44' being machined to form a machined composite material substrate 44". As shown in FIG. 6B, a material removal device 62, optionally in communication with a support 61, is shown in the form of a CNC device (referred to equivalently herein as a "CNC cutting machine", or "CNC machine", or CNC milling machine"), although present aspects contemplate the use of any material removal device including, for example, a laser, etc. According to present aspects the material removal device 62 can be in communication with a controller 64 that can, in turn be in communication with a processor 66 that can be programmed to deliver a signal to the controller 64 that can control, for example, the activation, movement, speed, etc., of the material removal device 62 for the purpose of, for example, cutting into the at least partially cured composite material second surface 44b' to a predetermined distance or predetermined thickness according to a programmed value inputted, for example at a processor input 68 to form a plurality of recesses 45 that are formed into the at least partially cured composite material substrate in a predetermined pattern. In an alternate aspect, the material removal device 62 is in communication with the processor 66 and the processor includes an integrated controller 67.

Figure 6C:
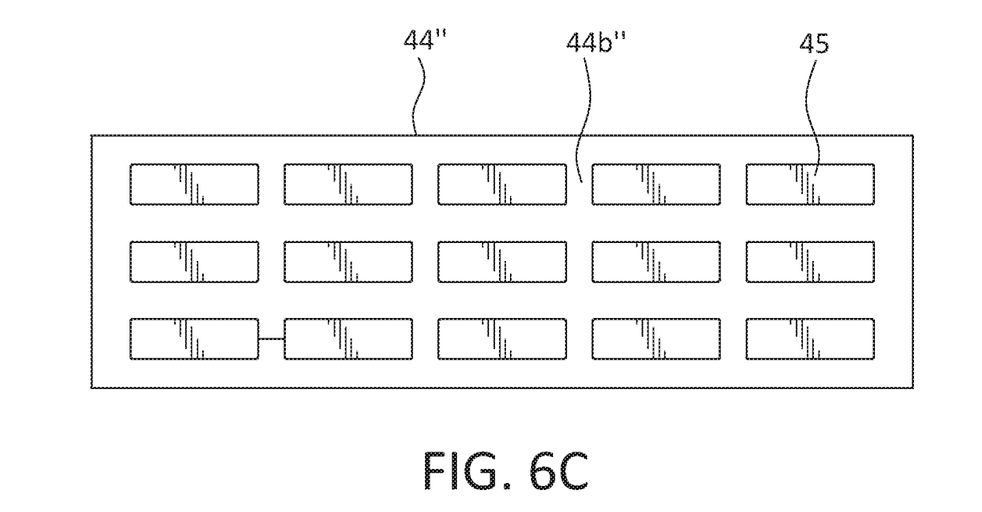
FIG. 6C is an overhead view representing the composite material substrate shown in FIGS. 6A and/or 6B, and showing a plurality of recesses machined into the composite material substrate, according to present aspects.

FIG. 6C shows an overhead plan view of a machined composite material substrate 44" with recesses 45 machined into the substrate. in a predetermined pattern, and to a predetermined thickness, with individual recesses 45 formed in the substrate such that according to present aspect, the recesses 45 are substantially uniform dimension. Although not shown, according to further aspect, the recesses can be formed such that the dimension of an individual recess changes, or the dimension of at least one of the recesses 45 changes, relative to the rest of the recesses, and according to a predetermined pattern.

Figure 6D:
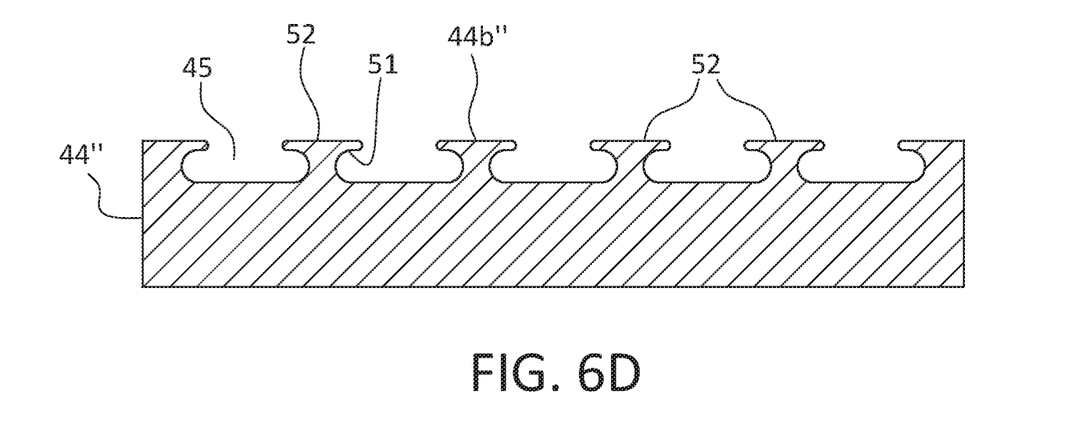
FIG. 6D is a cross-sectional side view of a composite material substrate machined to form a recess in the composite material substrate thickness according to present aspect, and showing recesses machined into the composite material substrate comprising internal fillet edges in the machined recesses.
Figure 6E:
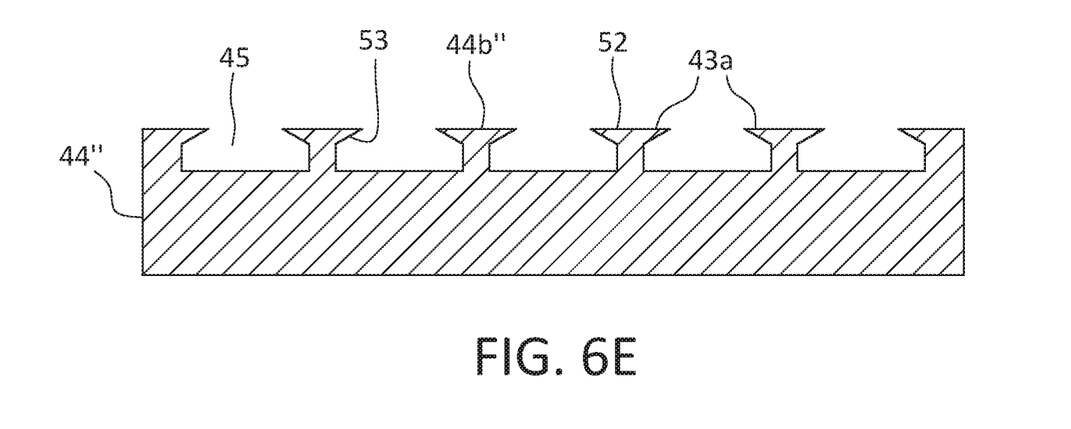
FIG. 6E is a cross-sectional side view of a composite material substrate machined to form a recess in the composite material substrate thickness according to present aspect, and showing recesses machined into the composite material substrate comprising internal chamfer edges in the machined recesses.

FIGS. 6D and 6E are enlarged cross sectional views of machined composite material substrates according to present aspects, showing alternate presently exemplary contemplated configurations for the recesses that are machined into the composite material substrates. As shown in FIG. 6D, a material removal device (not shown) that can be of the type shown in FIGS. 6A and/or 6B, has removed material from the composite material substrate to form recesses 45 and to form a machined composite material substrate 44". As shown in FIG. 6D, the recesses as shown have been machined to form fillet edges 51. In forming the fillet edges 51, recess surface regions 52 are preserved as compared to the recesses 45 shown in FIGS. 6A and 6B, for example. This additional surface area presented by the recess surface regions 52 provide additional surface area with which to adhere and/or bond the machined composite material substrate 44" to the at least partially cured composite material top layer 48' and can otherwise impact the structural integrity and strength and/or stiffness values of one or more of the machined composite material substrate 44" and a composite component 10 that can be a final composite component. According to present aspects, the design of the machined recesses can offer presently significant flexibility to the disclosed manufacturing methods and systems (as well as flexibility in the predetermined characteristics of the composite products machined by the present methods and systems).

As shown in FIG. 6E the recesses as shown have been machined to form chamfer edges 53. In forming the chamfer edges 53, recess surface regions 52 are preserved as compared to the recesses 45 shown in FIGS. 6A and 6B, for example. According to present aspects not specifically shown, the recesses can be machined into the composite material substrate to form recesses having any predetermined depth, any predetermined geometric profile, any predetermined volume, and the characteristics and dimensions of an individual recess can differ from other recesses according to predetermined end uses of the products (e.g. composite panels, assemblies, sub-assemblies, etc.).

Figure 7:
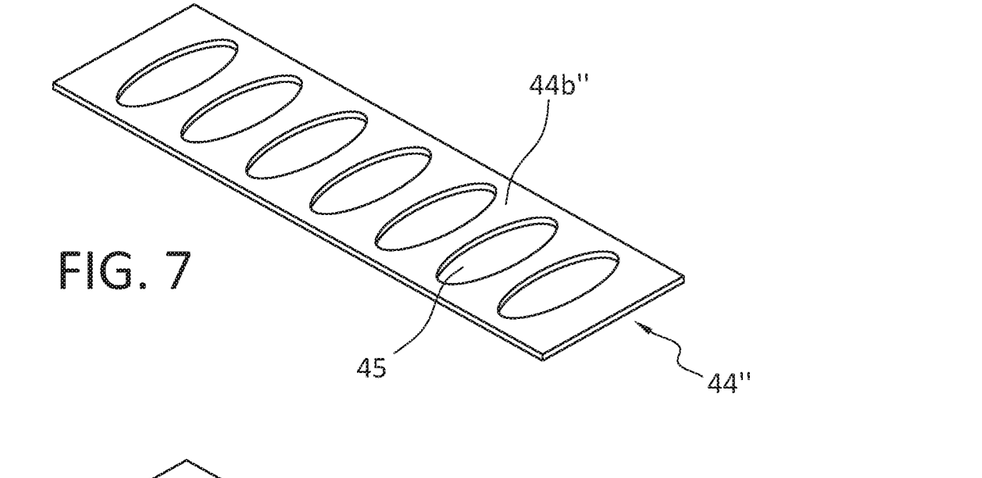
FIG. 7 is a perspective view of a machined composite material substrate having a plurality of recesses having a geometric profile that includes a predetermined pattern of ellipses, according to present aspects.
Figure 8:
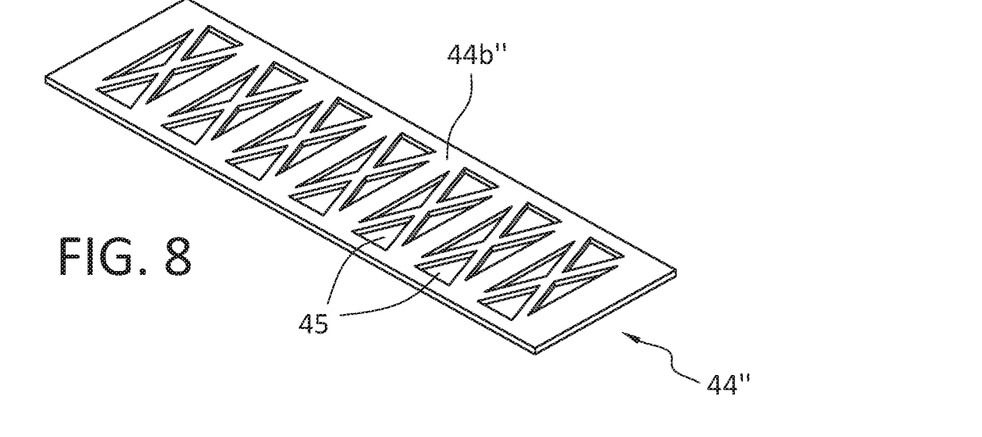
FIG. 8 is a perspective view of a machined composite material substrate having a recess geometric profile that includes a predetermined pattern of triangles, according to present aspects.
Figure 9:
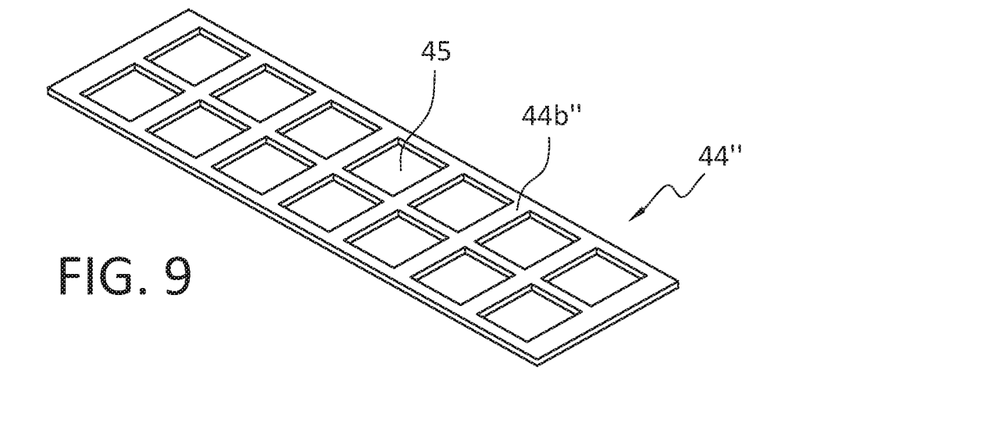
FIG. 9 is a perspective view of a machined composite material substrate having a recess geometric profile that includes a predetermined pattern of rectangles, according to present aspects.

FIGS. 7, 8, and 9 are perspective views of machined composite material substrates, according to present aspects, where the recesses are shown having various geometric profiles. As shown in FIG. 7, a machined composite material substrate 44" comprising a machined composite material substrate second surface 44b", into which a pattern of recesses 45 have been machined to a predetermined thickness for the purpose of removing a predetermined amount of substrate material from the substrate. As shown in FIG. 7, the recesses exhibit a geometric profile of an ellipse, although according to present aspects, any predetermined geometric profile can be machined into the substrate to form a predetermined pattern of recesses having any predetermined geometric profile.

For example, as shown in FIG. 8, a machined composite material substrate 44" comprising a machined composite material substrate second surface 44b", into which a pattern of recesses 45 have been machined to a predetermined thickness for the purpose of removing a predetermined amount of substrate material from the substrate. As shown in FIG. 8, the recesses exhibit a geometric profile of a plurality of triangles, although according to present aspects, any predetermined geometric profile can be machined into the substrate to form a predetermined pattern of recesses having any predetermined geometric profile.

By way of a further example, as shown in FIG. 9, a machined composite material substrate 44" comprising a machined composite material substrate second surface 44b", into which a pattern of recesses 45 have been machined to a predetermined thickness for the purpose of removing a predetermined amount of substrate material from the substrate. As shown in FIG. 7, the recesses exhibit a geometric profile of a rectangle (e.g., a rectangle in the form of a "square"), although according to present aspects, any predetermined geometric profile can be machined into the substrate to form a predetermined pattern of recesses having any predetermined geometric profile.

According to present aspects, including, for example, those shown in FIGS. 7, 8, and 9, the recesses machined into the at least partially cured composite material substrate can be manufactured according to any predetermined pattern and individual recesses can be machined to have any predetermined geometric profile, including three-dimensional geometric profiles, such that the machined component can be tailored to achieve a predetermined strength, stiffness, etc. according to specified performance standards for the components that are manufactured according to present aspects. Having the ability to tailor strength and stiffness along the area of a large component, such as, for example, for an aircraft, spacecraft, rotorcraft, etc., can assist in the design and manufacturing of large structures to address emerging issues regarding aerodynamic response including, for example, flutter.

Figure 10:
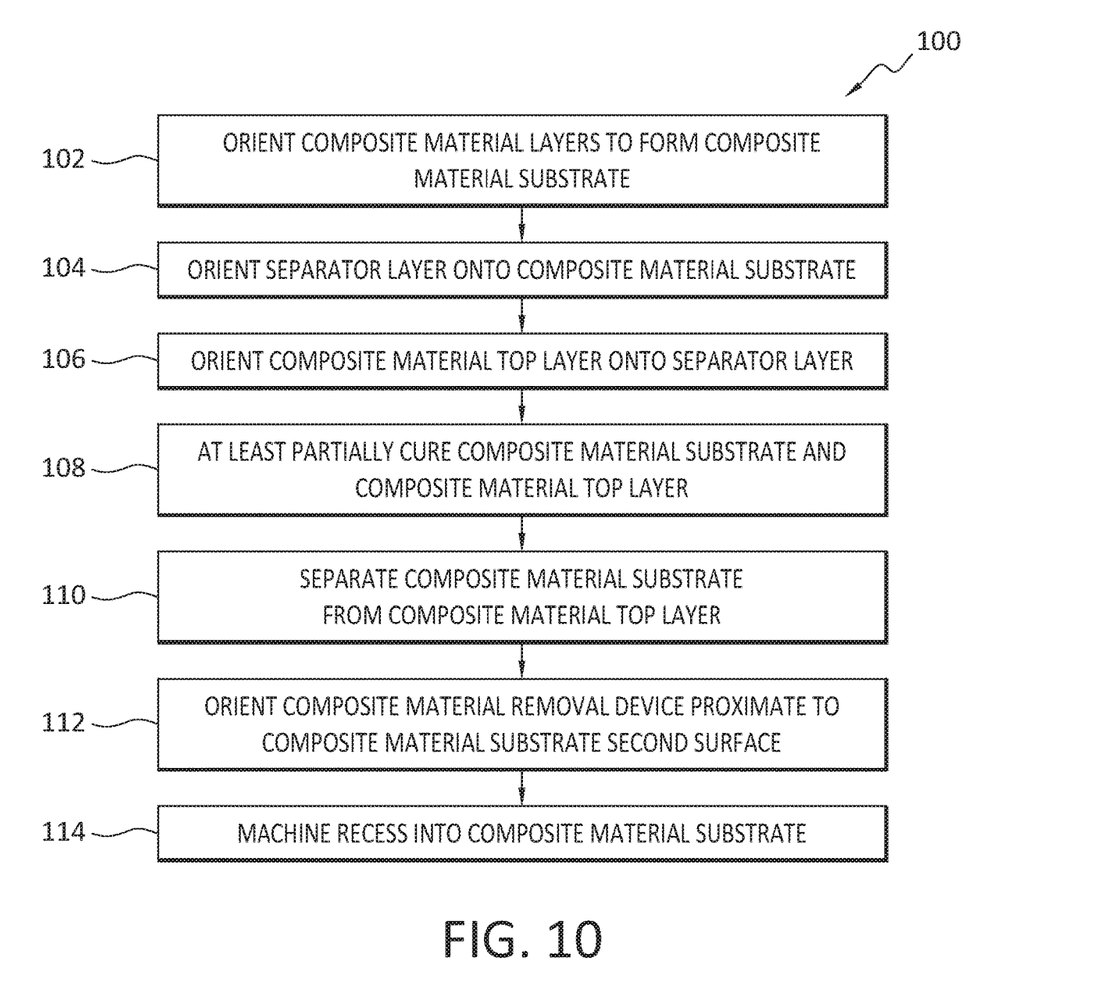
FIG. 10 is a flowchart outlining a method according to present aspects.
Figure 11:
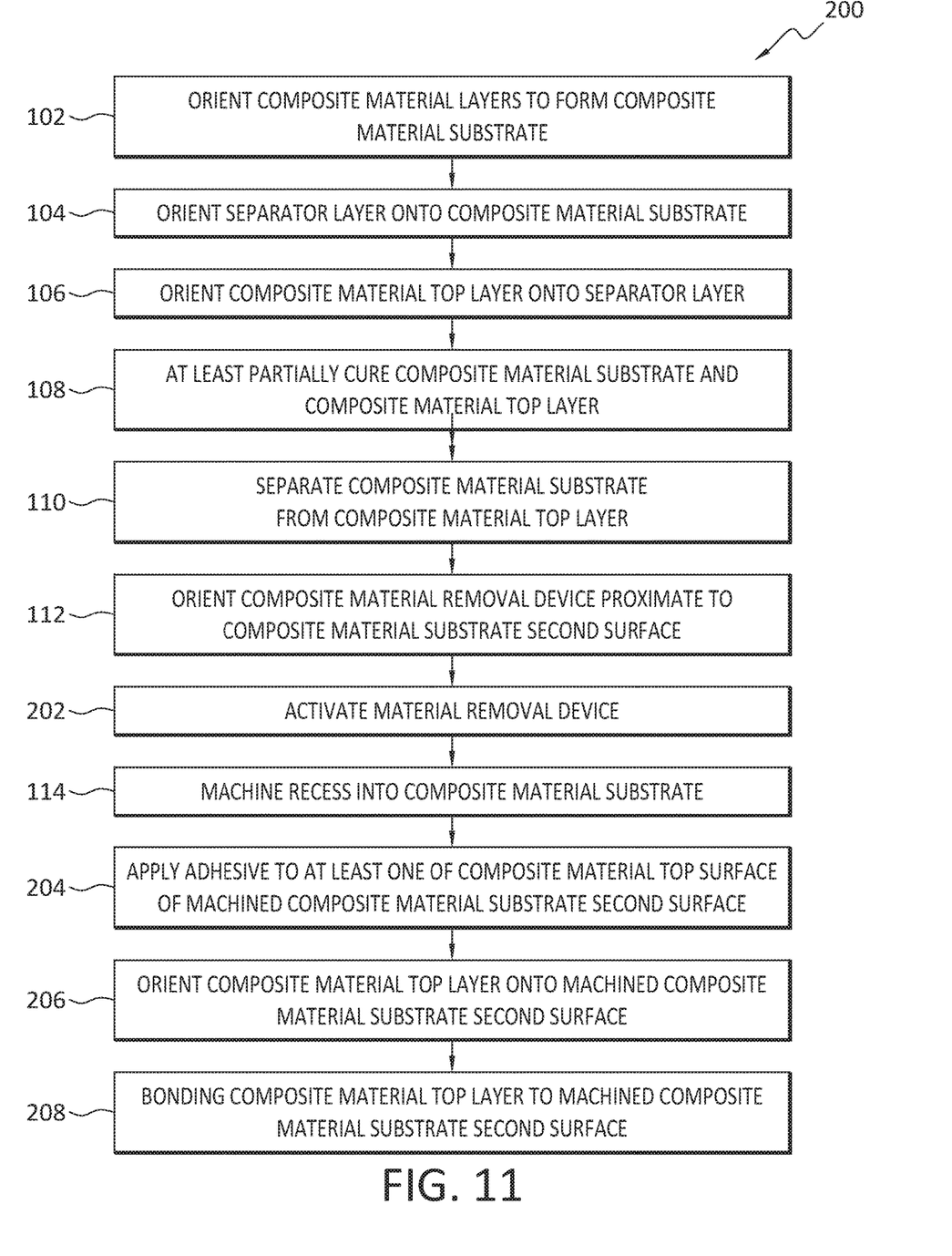
FIG. 11 is a flowchart outlining a method according to present aspects.

FIGS. 10 and 11 are flowcharts outlining methods according to further aspects of the present disclosure. As shown in FIG. 10, a method 100 according to present aspects is outlined including orienting 102 a plurality of composite material layers onto a tool to form a composite material substrate. According to present aspects, the composite material substrate can comprise a composite material substrate thickness, and the tool can be a molding tool that can comprise a tooling surface, with the composite material substrate further comprising a composite material substrate first surface and a composite material substrate second surface, and with the composite material substrate first surface positioned proximate to the tooling surface. The method 100 outlined in FIG. 10 further shows orienting 104 a separator layer onto the composite material substrate second surface. According to present aspects, the separator layer can be a caul plate or can be a film layer in combination with or otherwise integrating a release agent or release agent film. Method 100 as outlined in FIG. 10 further comprises orienting 106 a composite material top layer onto the separator layer, and at least partially curing 108 the composite material substrate and the composite material top layer to form at least partially cured composite material top layer and an at least partially cured composite material substrate having an at least partially cured composite material substrate second surface. Present aspects contemplate composite material curing protocols (temperature/pressure/time/ramp ups/cool downs, etc.) consistent with accepted practice for curing epoxy-resin containing composite materials, including so-called "bag and cure" techniques, for example, with heating applied under vacuum. According to one non-limiting example, and according to one aspect, a carbon-fiber epoxy-based composite material can observe a cure cycle comprising a temperature ramp up to about 350° F. and a 2 hour hold at such temperature. According to tailored and predetermined curing cycles, for example, and potentially in consideration of available production time, etc., ramp rates held at temperatures lower than 350° F. can be observed to accommodate, for example, a predetermined resin flow of an adhesive material, etc. In addition, during processing of the disclosed components comprising the machined composite material substrates with recesses, evacuation of some or substantially all of the air from the recesses (equivalently referred to herein as "recess pockets") can be accomplished under vacuum that can be a vacuum used during curing, or can be an additional vacuum supplied prior to curing, etc.

Method 100 further includes separating 110 the composite material top layer from the composite material substrate layer. Method 100 further includes optionally removing the separator layer from the composite material substrate to expose the composite material substrate second surface. Method 100 further includes orienting 112 a material removal device proximate to the composite material substrate second surface. According to present aspects, and as disclosed above, the material removal device can be a CNC machine, a laser, a drill, or other mechanical cutting device, etc., or combinations thereof. Method 100 further includes machining 114 at least one recess into the composite material substrate that can be a partially cured composite substrate material, and removing a predetermined amount of material from the composite material substrate to form a recess in the composite material substrate, said recess configured to extend from the composite material second surface to a predetermined distance into the composite material substrate thickness to form a machined composite material substrate, and with the machined composite material substrate comprising a machined composite material substrate first surface and a machined composite material substrate second surface.

As shown in FIG. 11, a method 200 according to present aspects is outlined including orienting 102 a plurality of composite material layers onto a tool to form a composite material substrate. According to present aspects, the composite material substrate can comprise a composite material substrate thickness, and the tool can be a molding tool that can comprise a tooling surface, with the composite material substrate further comprising a composite material substrate first surface and a composite material substrate second surface, and with the composite material substrate first surface positioned proximate to the tooling surface. The method 200 outlined in FIG. 11 further shows optionally orienting 104 a separator layer onto the composite material substrate second surface. According to present aspects, the separator layer can be a caul plate or can be a film layer in combination with or otherwise integrating a release agent or release agent film. Method 200 as outlined in FIG. 11 further comprises orienting 106 a composite material top layer onto the heating device, and at least partially curing 108 the composite material substrate and the composite material top layer to form at least partially cured composite material top layer and an at least partially cured composite material substrate having an at least partially cured composite material substrate second surface.

Method 100 further includes separating 110 the composite material top layer from the composite material substrate layer. Method 100 further includes orienting 112 a composite material removal device proximate to the composite material substrate second surface. According to further aspects, method 200 further includes activating 202 the material removal device, machining 114 at least one recess into the at least partially cured composite material substrate, with the recess configured to extend from the composite material second surface to a predetermined distance into the at least partially cured composite material substrate to form a machined composite material substrate, said machined composite material substrate comprising a machined composite material substrate first surface and a machined composite material substrate second surface. Method 200 further includes applying 204 an adhesive material layer to at least one of the composite material top layer or the machined composite material substrate second surface, orienting 206 the composite material top layer onto the machined composite material substrate second surface, and bonding 208 the composite material top layer to the machined composite material substrate second surface.

As with method 100 described above in FIG. 10 and as according to present aspects, in method 200, the material removal device can be a CNC machine, a laser, a drill, or other mechanical cutting device, etc., or combinations thereof. Present aspects further contemplate incorporating robotics and commensurate automation and control systems with the material removal device and material removal steps, including, for example, the incorporation of robotics also contemplated according to present aspects.

According to further present aspects, the composite material substrate and the composite material top layer use the same molding tool to further streamline fabrication and ensures the integrity of mating surfaces and bonding surfaces between the composite material substrate and the composite material top layer. The ability to manufacturer the 2-piece composite components according to present aspects, further reduces tooling expense and overall production cost, as fewer molding device need to be fabricated, stored, maintained, replaced set-up, etc.

The present invention may, of course, be carried out in other ways than those specifically set forth herein without departing from essential characteristics of the disclosure. The present aspects are to be considered in all respects as illustrative and not restrictive, and all changes coming within the meaning and equivalency range of the appended claims are intended to be embraced therein.

What is claimed is:

1. A method comprising:
orienting a plurality of composite material layers onto a tool to form a composite material substrate, said composite material substrate having a composite material substrate thickness, said tool comprising a tooling surface, and said composite material substrate further comprising a composite material substrate first surface and a composite material substrate second surface, said composite material substrate first surface positioned proximate to the tooling surface;
orienting a separator layer onto composite material substrate;
orienting a composite material top layer onto the separator layer;
at least partially curing the composite material substrate and the composite material top layer;
separating the composite material substrate and the composite material top layer;
orienting a composite material removal device proximate to the composite material substrate second surface; and
machining at least one recess into the composite material substrate and removing a predetermined amount of material from the composite material substrate to form a recess in the composite material substrate, said recess configured to extend from the composite material second surface to a predetermined distance into the composite material substrate thickness to form a machined composite material substrate, said machined composite material substrate comprising a machined composite material substrate first surface and a machined composite material substrate second surface.

2. The method of claim 1, the separator layer comprising a caul plate.

3. The method of claim 1, further comprising:
machining a plurality of recesses into the composite material substrate.

4. The method of claim 1, wherein the at least one recess comprises a geometric profile, said geometric profile comprising: at least one of: a rectangle; a circle; an ellipse; a triangle; a polygon; an irregular shape; or combinations thereof.

5. The method of claim 1, wherein the predetermined distance is equal to from about 10% to about 90% of the composite material thickness.

6. The method of claim 1, wherein the predetermined distance is equal to from about 50% to about 80% of the composite material thickness.

7. The method of claim 1, wherein the composite material removal device is a laser.

8. The method of claim 1, wherein the composite material removal device is a CNC machine.

9. The method of claim 1, wherein the composite material removal device is in communication with a controller.

10. The method of claim 3, further comprising:
machining the plurality of recesses into the composite substrate material in a predetermined pattern.

11. The method of claim 1, wherein at least one of the composite material substrate and the composite material top layer comprises a fiber-containing epoxy-based composite material.

12. The method of claim 1, wherein at least one of the composite material substrate and the composite material top layer comprises a carbon fiber-containing epoxy-based composite material.

13. A method comprising:
orienting a plurality of composite material layers onto a tool to form a composite material substrate, said composite material substrate having a composite material substrate thickness, said tool comprising a tooling surface, and said composite material substrate comprising a composite material substrate first surface and a composite material substrate second surface, said composite material substrate first surface positioned proximate to the tooling surface;
orienting a separator layer onto the composite material substrate second surface;
orienting a composite material top layer onto the separator layer;
at least partially curing the composite material substrate and the composite material top layer to form an at least partially cured composite material substrate and an at least partially cured composite top layer;
separating the composite material substrate and the composite material top layer;
orienting a material removal device proximate to the composite material substrate second surface;
activating the material removal device;
machining at least one recess into the at least partially cured composite material substrate, said recess configured to extend from the composite material second surface to a predetermined distance into the at least partially cured composite material substrate to form a machined composite material substrate, said machined composite material substrate comprising a machined composite material substrate first surface and a machined composite material substrate second surface;
applying an adhesive material to at least one of the composite material top layer or the machined composite material substrate second surface;
orienting the composite material top layer onto the machined composite material substrate second surface; and
bonding the composite material top layer to the machined composite material substrate second surface.

14. The method of claim 13, further comprising:
machining a plurality of recesses recess into the composite material substrate.

15. The method of claim 14, wherein the plurality of recesses comprises a geometric profile, said geometric profile comprising: at least one of: a rectangle; a circle; an ellipse; a triangle; a polygon; an irregular shape; or combinations thereof.

16. The method of claim 14, comprising machining the plurality of recesses into the composite substrate material in a predetermined pattern.

17. The method of claim 13, wherein at least one of the composite material substrate and the composite material top layer comprises a fiber-containing epoxy-based composite material.

18. The method of claim 13, wherein at least one of the composite material substrate and the composite material top layer comprises a carbon fiber-containing epoxy-based composite material.

19. The method of claim 13, further comprising applying an adhesive material to the composite material top layer and the machined composite material substrate second surface.

20. The method of claim 13, further comprising disposing the adhesive material between the machined composite material second surface and the composite material top layer.

* * * * *